(12) United States Patent
Dvorkin et al.

(10) Patent No.: US 6,249,686 B1
(45) Date of Patent: Jun. 19, 2001

(54) INTERNAL CIRCUIT FOR ADAPTIVE MODE SELECTION OF MULTI-MODE RF INTEGRATED CIRCUIT

(75) Inventors: Vladimir Dvorkin, Castro Valley; Michael G. Wong, Newark, both of CA (US)

(73) Assignee: Philips Electronics N.A. Corp., New York, NY (US)

( * ) Notice: Subject to any disclaimer, the term of this patent is extended or adjusted under 35 U.S.C. 154(b) by 0 days.

(21) Appl. No.: 09/218,547

(22) Filed: Dec. 22, 1998

(51) Int. Cl.[7] ................................................. H04B 1/40
(52) U.S. Cl. ..................... 455/552; 455/232.1; 455/333; 455/553
(58) Field of Search .................................. 455/553, 102, 455/103, 132, 133, 232.1, 234.1, 234.2, 245.2, 246.2, 333, 552; 327/564

(56) References Cited

U.S. PATENT DOCUMENTS

| 5,004,934 | 4/1991 | Furauta ................................ 307/303 |
| 5,420,911 | 5/1995 | Dahlin et al. ......................... 379/59 |
| 5,519,887 | 5/1996 | Lieu ..................................... 455/266 |
| 5,533,099 | 7/1996 | Byrne .................................... 379/58 |
| 5,694,414 | 12/1997 | Smith .................................. 375/200 |
| 5,694,614 | 12/1997 | Bennett ............................... 395/800 |
| 5,745,523 | 4/1998 | Dent et al. ........................... 375/216 |
| 6,134,453 | * 10/2000 | Sainton et al. ....................... 455/553 |

* cited by examiner

*Primary Examiner*—Lee Nguyen
(74) *Attorney, Agent, or Firm*—Dicran Halajian

(57) ABSTRACT

An RF integrated circuit includes an improved control circuit for switching between at least two modes of operation, depending upon a characteristic of a signal received by the integrated circuit, the RF integrated circuit including a first input for receiving a first RF signal, when the integrated circuit is in a first mode; a second input for receiving a second input signal when the integrated circuit is in a second mode; and a detector on the integrated circuit couples to the first and second inputs for detecting the presence of the first and second RF signals, and producing an output signal at a logic port of the detector, depending on the state of the first and second RF signals; and a controller on the integrated circuit connected to the detector for switching the integrated circuit between the first mode and the second mode in response to the output signal without the need for the application of an external control signal to the integrated circuit.

11 Claims, 1 Drawing Sheet

INTERNAL CIRCUIT FOR ADAPTIVE MODE SELECTION OF MULTI-MODE RF INTEGRATED CIRCUIT

BACKGROUND OF THE INVENTION

This invention relates generally to radio frequency integrated circuits, and more particularly to a multi-mode RF integrated for use in a mobile radio or similar application.

There is a need for integrated circuits for applications such as mobile radio including but not limited to cellular telephones that can operate in more than one mode. For example, as the mobile radio and cellular telephone infrastructures move from predominantly analog to digital modes of operation, there is a need for mobile radios that operate in both of these modes, analog and digital. Dual mode portable telephones that operate in the cellular and PCS modes of operation allow a user to use the phone in the cellular band of frequencies or in the PCS band of frequencies depending on the user's location.

Dual mode operation also permits the radio frequency integrated circuits (RFICs) to be reconfigured, such as by inserting or removing amplifiers from the received signal path, so that weak signals can be amplified sufficiently by inserting the low noise amplifier in the path, or strong signals can be received without distortion by removing the low noise amplifier from the single path when the received signal strength is adequate for processing without it.

The need for additional functionality in RF integrated circuits, particularly the need for multiple mode RFICs conflicts with the demand for ever smaller systems. Mobile radios generally, and cellular telephones in particular are already very compact, and the demand for ever smaller phones continues to grow.

As phones become smaller, the physical requirements for smaller and smaller RFICs grows as well. One of the requirements for reducing the size of RFICs is to reduce the pin count. Adding additional features, such as multiple modes or functions as, heretofore, required that new control connections and additional pins be added to the IC to select among multiple modes or control the multiple functions. The addition of pins is inconsistent with the reduction in size of RFICs, and it is to this problem the present invention is addressed.

SUMMARY OF THE INVENTION

It is an object of this invention to provide a radio frequency integrated circuit having multiple modes of operation and/or multiple functions.

It is another object of the invention to provide a multi mode or multi function RFIC having no additional control pins for selecting the mode or activating and deactivating the function.

It is another object of the invention to provide a multi mode or multi function RFIC that automatically determines the appropriate mode of operation and/or whether to activate or deactivate the function based on detecting signals within the RF integrated circuit, and using the state of those signals to control the mode or function of the RF integrated circuit without the need for the application of an external control signal and, more important, without the need for an extra pin through which the control signal is applied.

Briefly stated in accordance with a presently preferred embodiment of the invention, an RF integrated circuit for a cellular telephone set includes an improved control circuit for switching between at least two modes of operation, depending upon a characteristic of a signal received by the integrated circuit, the RF integrated circuit including a first input for receiving a first RF signal, when the integrated circuit is in a first mode; a second input for receiving a second input signal when the integrated circuit is in a second mode; and a detector on the integrated circuit couples to the first and second inputs for detecting the presence of the first and second RF signals, and producing an output signal at a logic port of the detector, depending on the state of the first and second RF signals; and a controller on the integrated circuit connected to the detector for switching the integrated circuit between the first mode and the second mode in response to the output signal without the need for the application of an external control signal to the integrated circuit.

In accordance with another aspect of the invention, the integrated circuit includes a first RF amplifier on the integrated circuit and operative in a first mode, the RF amplifier having a first control input for activating the amplifier, the integrated circuit also including a second RF amplifier on the integrated circuit operative in the second mode, and having a second control input for activating the second RF amplifier, the first and second control inputs connected to the controller, so that the first RF amplifier is activated in the first mode, and the second RF amplifier is activated in the second mode.

In accordance with yet another aspect of the invention, an RF processor integrated circuit is provided for a cellular telephone that can operate in a PCS mode and a cellular mode, and a controller for switching between modes without the application of an external control signal from a source off the chip.

In accordance with another aspect of the invention, an autonomous RF integrated circuit includes a controllable attenuator in a signal path of the integrated circuit, and a detector responsive to the received signal level for generating the signal output related to the received signal level, the attenuator having a control input connected to the detector for changing the attenuation of the attenuator in response to the strength of the received signal.

In accordance with another aspect of the invention, an autonomous RF processor integrated circuit includes a low noise amplifier and a detector responsive to the received signal level for selectively inserting the low noise amplifier in the signal path, or of removing it where the received signal strength is adequate for processing without the amplifier.

BRIEF DESCRIPTION OF THE DRAWINGS

The novel aspects of the invention are set forth with particularity in the appended claims. The invention itself, together with further objects and advantages thereof may be more readily comprehended by reference to the following detailed description of a presently preferred embodiment of the invention, taken in conjunction with the accompanying drawings, in which:

DETAILED DESCRIPTION OF THE PREFERRED EMBODIMENT

Figure 1:
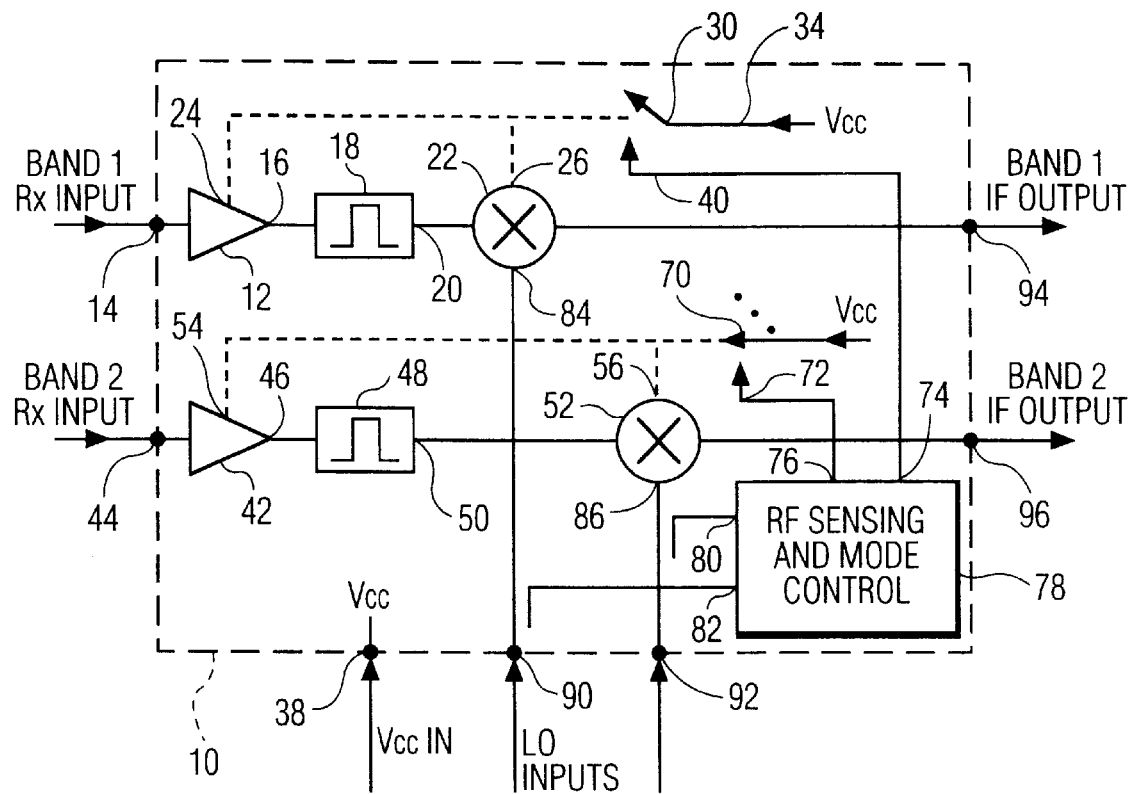
FIG. 1 is a block diagram schematic of a portion of a radio frequency integrated circuit in accordance with the invention.

Referring now to FIG. 1, a portion of a radio frequency integrated circuit (RFIC) is enclosed within outline 10. This may be an entire RFIC, but more likely only a portion of an RFIC that includes additional circuitry. The RFIC is formed on a semiconductor chip using available appropriate fabrication methods. The invention is not limited to any particular semi-conductor technology.

The chip includes a number of input and output connections shown in FIG. 1 as dots on the block diagram schematic. Physically, these connections are pads on the integrated circuit chip that are connected to pins or the equivalent structure on the integrated circuit package. Adding pins to an integrated circuit chip increases the chip size, because additional, physically large pads must be added, and increases the size of the package because additional pins must be added. Increasing the size of an integrated circuit chip increases its cost, and usually reduces the yield. Increasing the size of the package in which the integrated circuit is mounted may make the package large for a particular application. The present invention eliminates the need for adding pins to the RF integrated circuit for controlling operation modes. Further, the present invention reduces or eliminates the need for external control circuits, especially external circuits used for mode detection and generation of mode control signals provided to the dedicated RF integrated circuit.

Referring again to FIG. 1, the RF integrated circuit includes RF amplifier 12 adapted to amplify received cellular telephone signals, and including an input 14 for receiving the signals from the antenna, a duplexer, filters external to the chip, or the like. Amplifier 12 has an output 16 connected to a filter 18, which in turn has an output 20 connected to a mixer 22. All of this is conventional circuitry in cellular telephone receivers.

The RF amplifier 12 has a power input 24 for activating or deactivating the amplifier. Mixer 22 has a power input 26 for activating and deactivating the mixer. The power inputs 24 and 26 are connected to one terminal of a controllable switch 30, which has another terminal 34 connected to an off chip supply of corrective voltage of $V_{cc}$ which is preferably connected to the chip at terminal 38. Switch 30 is controlled by control input 40, which is adapted to receive a logic level signal for selectively opening and closing the switch. The switch 30 may be a transistor formed on the integrated circuit.

The RF integrated circuit includes a second RF amplifier 42 adapted to amplify received PCS telephone signals, and including an input 44 for receiving the signals from the antenna, a duplexer, filters external to the chip, or the like. Amplifier 42 has an output 46 connected to a filter 48, which in turn has an output 50 connected to a mixer 52. These parts correspond substantially to the similar parts for the cellular telephone channel of the RF integrated circuit.

Amplifier 42 and mixer 52 have power inputs 54 and 56 respectively. These are connected to one terminal of a controllable switch 70, a second terminal of which is connected to power source $V_{cc}$. Switch 70 is controlled by a logic level signal applied to control input 72. Switches 30 and 70 are configured, so that when switch 30 is on, switch 70 is off, and vice versa.

Control inputs 40 and 72 of switches 30 and 70 respectively are connected to first and second outputs 74 and 76 of RF sensing and mode control circuit 78. The RF sensing and mode control circuit 78 has first and second inputs 80 and 82 that are coupled to local oscillator inputs 84 and 86 of mixers 22 and 52 respectively. Preferably, the inputs to the RF sensing and mode control circuit are capacitively coupled to the inputs of mixers to couple a small amount of the signal applied to the mixers, just adequate to trigger detectors in the sensing and mode control circuit for producing logic level signals at outputs 74 and 76 for operating switches 30 and 70.

The local oscillator signals are applied through pins 90 and 92 of the RF integrated circuit, and out IF outputs of the mixers 22 and 52 are provided at pins 94 and 96 of the RF integrated circuit respectively.

This arrangement permits the RF integrated circuit to autonomously switch between a cellular mode of operation, and a PCS mode of operation, based solely on sensing the local oscillator inputs to the mixers for the cellular and PCS signal chains respectively, without the need for a separate control input for switching modes.

Figure 2:
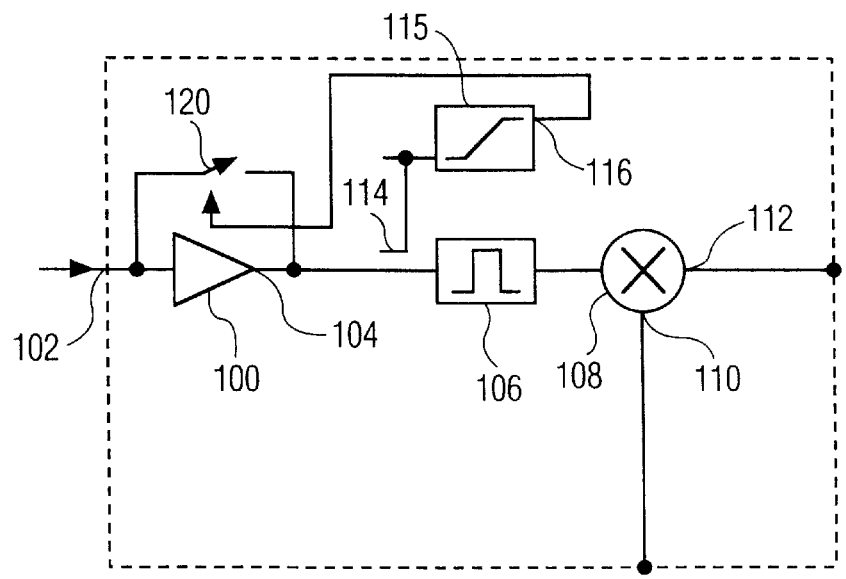
FIG. 2 is a block diagram schematic of a portion of another radio frequency integrated circuit in accordance with another aspect of the invention.

Referring now to FIG. 2, an autonomous RF processor integrated circuit is illustrated that includes an amplifier 100 having an input 102 connected to an off chip source, and an output 104 connected to a filter 106 whose output is connected to a first input of a mixer 108. The mixer has a second input 110 and an output 112, both of which may be connected to input/output pins of the RF integrated circuit.

Capacitive tap 114 is connected to the output of amplifier 100 and to an input of a threshold detecting mode controller 115 which produces a control signal at an output 116 thereof, which controls a switch 120 connected across amplifier 100 for selectively bypassing the amplifier if a strong enough signal is produced, so as to improve linearity and prevent overloading the amplifier. The mode controller 115 is responsive to a received signal level, and while a switch is shown for bypassing the amplifier entirely, the signal produced at output 116 could be used to proportionally control the gain of the amplifier in response to this signal output.

In accordance with another embodiment of the invention, the amplifier 100 can be replaced with a controllable attenuator, the attenuation of which can be controlled by the output of controller 115.

The invention has been described in connection with a presently preferred embodiment thereof in a cellular telephone. Those skilled in the art will recognize that many modifications and changes may be made therein without departing from the true spirit and scope of the invention. The invention has applicability beyond cellular telephones, and even beyond mobile radios. This invention accordingly is intended to be defined solely by the appended claims.

What is claimed is:

1. In a radio frequency integrated circuit, an improved control circuit for switching between at least two modes of operation depending upon a characteristic of a signal received by the integrated circuit, comprising:

a first input for receiving a first RF signal when the integrated circuit is in a first mode;

a second input for receiving a second RF signal when the integrated circuit is in a second mode;

a detector on the integrated circuit connected to the first and second inputs for detecting the presence of the first and second RF signals and producing an output signal at a logic port of the detector; and a controller on the integrated circuit, connected to the detector for switching the integrated circuit between the first mode and the second mode in response to the output signal without the need for application of an external control signal to the integrated circuit.

2. The integrated circuit of claim 1 in which the first and second RF signals comprise first and second local oscillator signals.

3. The integrated circuit of claim 1 comprising a first RF amplifier on the integrated circuit operative in the first mode, and having a first control input for activating the first RF amplifier; a second RF amplifier on the integrated circuit operative in the second mode and having a second control input for activating the second RF amplifier; the first and second control inputs connected to the controller so that the first RF amplifier is activated in the first mode, and the second RF amplifier is activated in the second mode.

4. The integrated circuit of claim I in which the detector is connected to the first and second inputs by first and second capacitive taps.

5. The integrated circuit of claim 1 comprising a first RF mixer on the integrated circuit operative in the first mode, and having a first control input for activating the first RF mixer; a second RF mixer on the integrated circuit operative in the second mode and having a second control input for activating the second RF mixer; the first and second control inputs connected to the controller so that the first RF mixer is activated in the first mode, and the second RF mixer is activated in the second mode.

6. The integrated circuit of claim 1 further comprising:
   a further detector responsive to one of said first and second RF signals, and having a detector output for generating a detector control signal which is indicative of one of the two modes of operation;
   a further controller for configuring at least one function of the integrated circuit solely in response to the output of the further detector.

7. The integrated circuit of claim 6 in which the at least one function comprises the gain of at least one stage of the RF processor integrated circuit.

8. The integrated circuit of claim 6 further comprising a controllable attenuator in a signal path of the integrated circuit, and in which the further detector is responsive to a received signal level for generating a signal output related to the received signal level, and in which the further controller is connected to the controllable attenuator for changing the attenuation of the attenuator in response to the signal output.

9. The integrated circuit of claim 6 further comprising a low noise amplifier in a signal path of the integrated circuit, and in which the further detector is responsive to a received signal level for generating a signal output related to the received signal level, and in which the further controller is connected to the low noise amplifier for changing the gain of the amplifier in response to the signal output.

10. The integrated circuit of claim 1 in which the first mode is a PCS telephone mode, and the second mode is a cellular telephone mode.

11. The integrated circuit of claim 1 further comprising a first RF mixer on the integrated circuit operative in the first mode, and having a first control input for activating the first RE mixer; a second RE mixer on the integrated circuit operative in the second mode and having a second control input for activating the second RE mixer; the first and second control inputs being connected to the controller so that the first RE mixer is activated in the first mode, and the second RE mixer is activated in the second mode.

* * * * *